United States Patent [19]

Wieting

[11] 4,059,905
[45] Nov. 29, 1977

[54] APPARATUS FOR LOCATING ACCESS OPENINGS FOR ELECTRICAL OUTLET BOXES IN COVERING MEMBERS

[76] Inventor: James H. Wieting, 12914 Memorial Drive, Houston, Tex. 77024

[21] Appl. No.: 661,624

[22] Filed: Feb. 26, 1976

[51] Int. Cl.² ............................................. G01B 5/14
[52] U.S. Cl. ........................... 33/180 R; 33/DIG. 10
[58] Field of Search ......... 33/180 R, 174 G, DIG. 10

[56] References Cited

U.S. PATENT DOCUMENTS

| | | | |
|---|---|---|---|
| 2,775,812 | 1/1957 | Mohr | 33/DIG. 10 |
| 2,788,151 | 4/1957 | Shore | 33/DIG. 10 |
| 2,898,688 | 8/1959 | Cottar | 33/174 G |
| 3,823,754 | 7/1974 | Nix | 33/DIG. 10 |

Primary Examiner—Harry N. Haroian
Attorney, Agent, or Firm—Jennings B. Thompson

[57] ABSTRACT

The apparatus disclosed includes a locator pin assembly for mounting on the outlet box before the covering member is placed over the box. It includes one or more pins, depending on the type of outlet box, that are attached to and extend perpendicularly from opposite sides of the mounting plate. The pins are sharp on both ends and pierce the covering member when the member is positioned over the box. A template is mounted on the protruding pin or pins to guide a cutting tool as it cuts the access opening for the box. The pin or pins extend different distances on opposite sides of the plate. On one side, the pins extend a relatively short distance for use with relatively thin covering members, such as wood paneling. On the other side, the pins extend a relatively long distance for use with relatively thick covering members, such as wallboard. An extractor is provided to attach the template to the locator pin assembly through the covering member to hold the template in position during the cutting operation and to allow the scrap and locator pin assembly to be removed together through the access opening.

7 Claims, 7 Drawing Figures

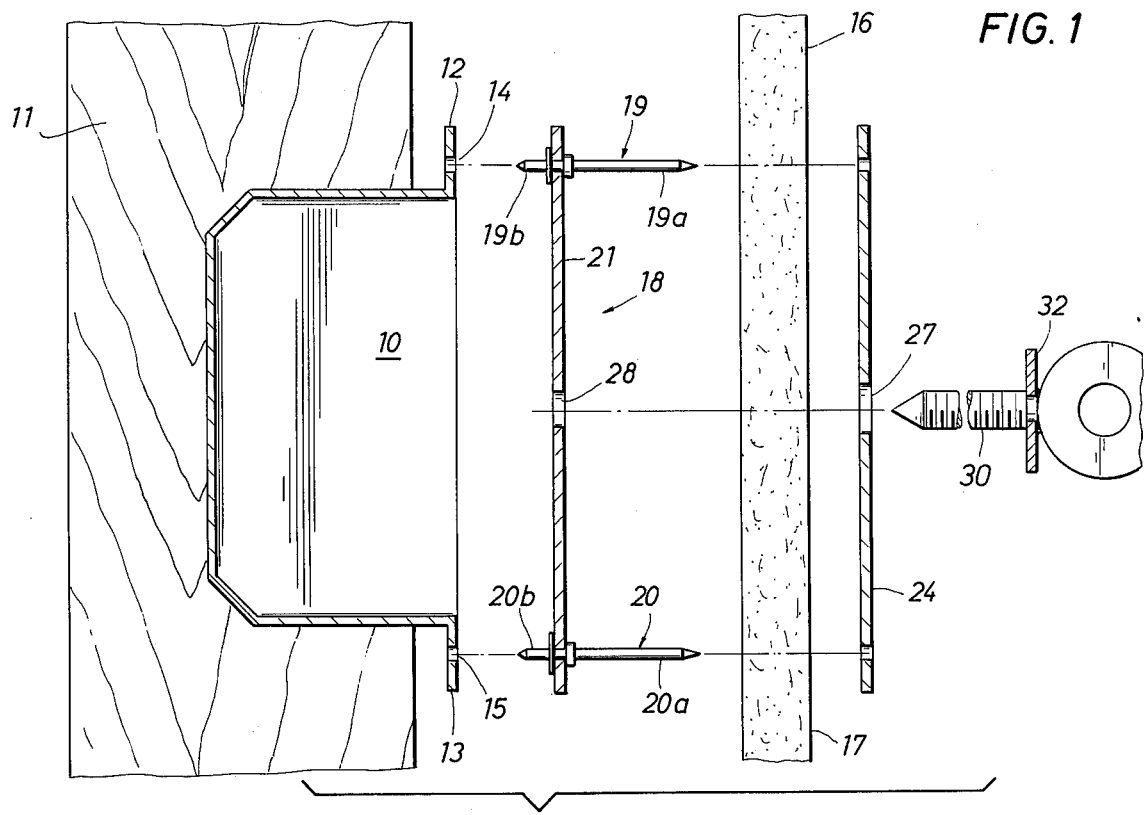
FIG. 1
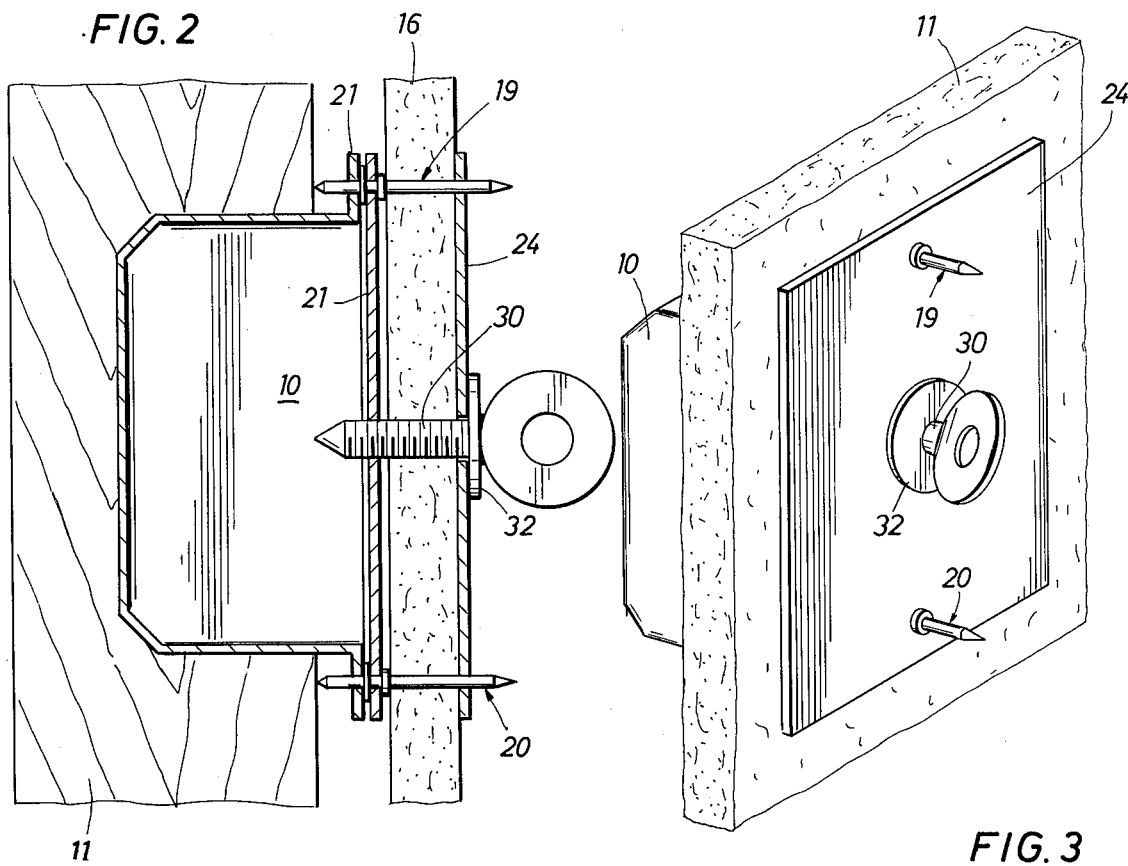
FIG. 2
FIG. 3

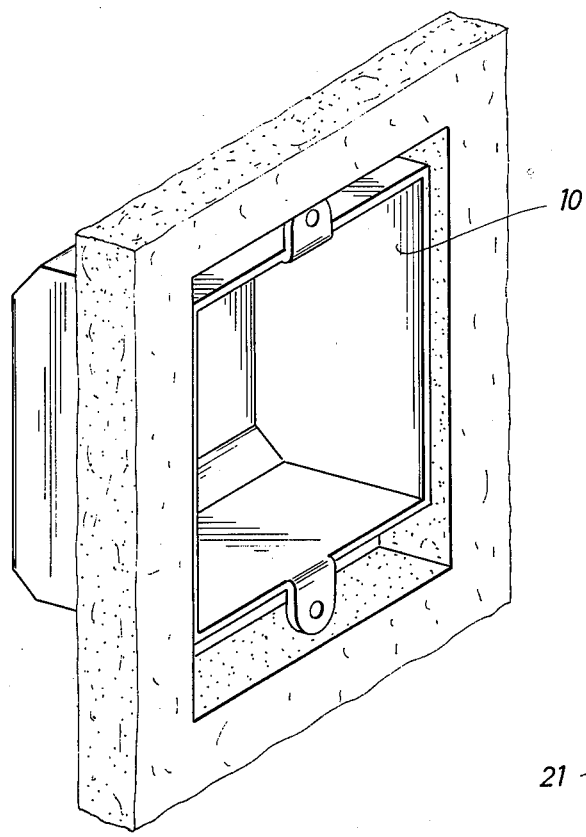
FIG. 4
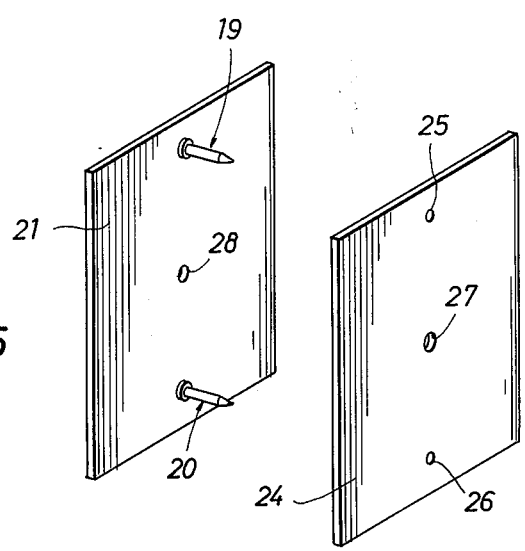
FIG. 5
FIG. 6
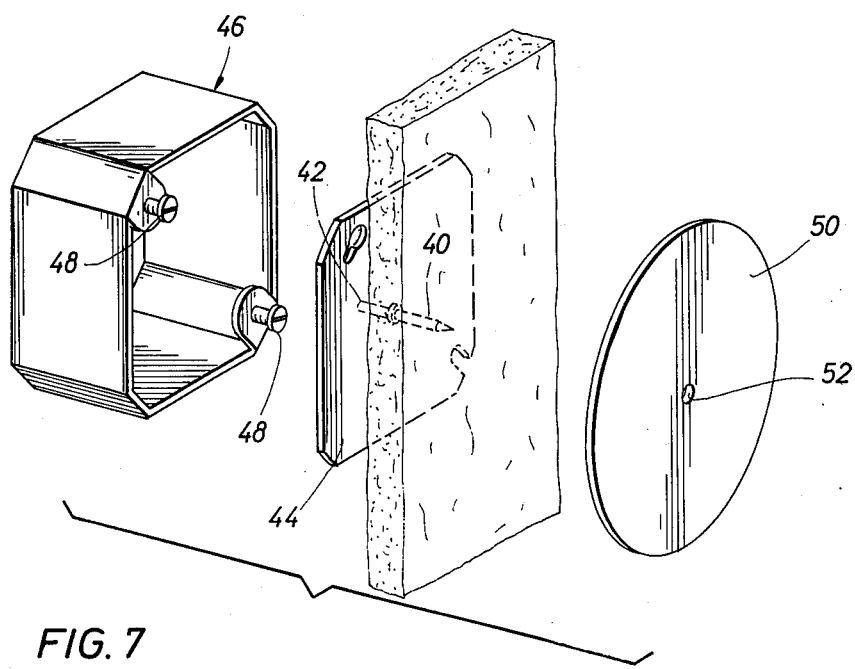
FIG. 7

APPARATUS FOR LOCATING ACCESS OPENINGS FOR ELECTRICAL OUTLET BOXES IN COVERING MEMBERS

This invention relates to building construction, and is directed more particularly to apparatus for locating access openings for electrical outlet boxes in covering members, such as sheets of wallboard, wood paneling, and the like.

In the mass construction of modern housing units, commercial office buildings, and the like, it has become customary to use, in lieu of plaster, covering members, such as sheets of wallboard, gypsum board, and the like. The sheets are secured to the studding or framing of the walls or ceiling, sealed along the abutting edges thereof by taping the joints between the sheets, and finished by painting, papering, or any other well known technique. It also a common practice today to use as covering members, relatively thin sheets of plywood formed from the veneer of highly attractive woods, such as mahogany and walnut, in lieu of wallboard, gypsum board, and the like. Such covering members, whether wallboard, gypsum board or wood paneling, is generally obtained in sheets which are cut to length and attached to the studding or framing of the walls or ceiling. Prior to the installation of the covering members, electrical outlet boxes, which house switches, electrical outlet plugs, and ceiling fixture connections, are located in the desired position on the studs and framing of the walls and ceiling. These outlet boxes are located to extend through access openings formed in the covering members. Therefore, such access openings must be formed in the members either before or at the time the members are installed. Various methods and apparatus have been employed in the past to locate these access openings. One method, of course, is to simply measure from the edge of the adjoining cover member the distance to the outlet box and the distance to the outlet box from the floor or some other reference point, and then cut the access opening based on these measurements prior to placing the cover member in position. Another commonly used method is to apply chalk to the edge of the box, place the covering member into position so that the chalk is transferred to the member to indicate the proper location of the opening.

Also, various devices have been proposed that can be mounted on the outlet boxes to position templates to guide cutting tools for forming the access opening. For example, see U.S. Pat. Nos. 2,775,812, 2,788,151, 3,733,707, and 3,823,754.

As shown in the above-listed patents, template locating members have been provided for mounting on the outlet boxes to extend through the covering member and locate a template to guide the cutting of the access opening. In the latter two patents, an opening is provided in the covering member to receive the locating members. This means that some measuring must be done to locate the opening with reasonable accuracy. In the first two patents listed, locating members, such as flat blades, are forced through the covering member. This can be done with relative ease when using covering members of gypsum board or the like. With wood paneling, however, considerably more force is required to force the locating member through the wood. Thus, template locating members long enough to penetrate relatively thick gypsum board will have a much greater tendency to bend when subjected to the greater force required for wood paneling.

Therefore, it is an object of this invention to provide apparatus for locating access openings for electrical outlet boxes in covering members that employs one length of template locating member for relatively thick covering members of the gypsum board type and another length for relatively thin covering members, such as wood paneling.

It is a further object of this invention to provide access opening locating apparatus in which the template locator pins are rigidly supported so that they will penetrate both gypsum board and wood paneling without bending.

It is a further object of this invention to provide such apparatus that includes a template for locating on the locating members after they have penetrated the covering member and an extractor that will hold the template in position on the locator members while the access opening is being cut and which will allow the template and the locating members to be easily removed with the scrap through the access opening so formed.

These and other objects, advantages, and features of the invention will be apparent to those skilled in the art from a consideration of this specification, including the attached drawings and appended claims.

In the drawings:

FIG. 1 is a cross-sectional, exploded view of the apparatus of this invention;

FIG. 2 is a cross-sectional view through the apparatus of this invention in position for the access opening to be cut in the covering member;

FIG. 3 is an isometric view of the apparatus as assembled in FIG. 2;

FIG. 4 is a view similar to FIG. 3 with the apparatus removed and the covering member in place with the outlet box located in the access opening;

FIG. 5 is an isometric view of the locator pin assembly;

FIG. 6 is an isometric view of the template; and

FIG. 7 is an exploded view of an alternate embodiment of the apparatus of this invention.

Electrical outlet box 10, as shown in FIGS. 1-4, is of the type designed to receive electrical switches and outlet plugs. It is mounted on stud 11 in a conventional manner, with the open end of the box facing the room. The box has tabs 12 and 13 that are connected to and flush with the front edge of the box to provide mounting holes 14 and 15. The mounting holes are tapped to receive mounting screws that hold the electrical apparatus, whether it be a switch or outlet plug, in position in the box. The front or forward edge of the box, along with tabs 12 and 13, are spaced from the edge of stud 11 a distance to place the front edge of the box generally flush with the front side 16 of covering member 17 when the covering member is in position attached to stud 11.

In accordance with this invention, the apparatus includes a locator pin assembly having a body with locator pins extending therefrom in opposite directions and for different distances. This provides a pin for hard to penetrate relatively thin covering members that is no longer than necessary to pierce the member and support a template, thereby reducing the tendency of the pin to bend. The pin on the other side can be long enough for the thicker but less dense covering members. In each case the pin not being used to pierce the cover member provides lateral support for the other. The body serves as means to hold the pin or pins in the desired position and to resist the longitudinal thrust imposed on the pins by the piercing operation.

In the embodiment shown in FIGS. 1-6, locator pin assembly 18 has two sharpened locator pins 19 and 20 mounted on a body to extend perpendicularly from both sides thereof and for different distances. Preferably, the pins are circular in cross section to provide the maximum resistance to bending under the force of penetrating the cover mmember with a minimum of cross-sectional area. As explained above, the body provides means to hold the pins in fixed parallel relationship for insertion into the mounting holes of the outlet box and to resist the force of piercing the member by limiting the distance the pins can be inserted into the holes. In the embodiment shown in FIGS. 1-6, the body or holding means includes flat, generally rectangular, plate 21 through which locator pins 19 and 20 extend. Openings are provided in the locator plate to receive the pins which are then attached to the plate by welding, or any other convenient manner, to hold the pins from movement relative to the plate.

As explained above, it is one of the features of this invention that locator pins 19 and 20 are positioned relative to plate 21 so that on one side of the plate, the pins extend substantially further from the plate than they do on the opposite side. As shown in FIG. 1, portions 19a and 20a of pins 19 and 20 are substantially longer and thus extend farther from the plate than portions 19b and 20b. As shown, the locator pin assembly is positioned for the shorter portions 19b and 20b to be inserted through mounting holes 14 and 15 to mount the locator pin assembly on the outlet box. So positioned, covering member 16, which is of the gypsum board type, is trimmed to the proper dimensions and then placed in position to be nailed to stud 11 and other framing. As it is moved into position, it engages pins 19 and 20, and in particular, the elongated portions 19a and 20a, which will penetrate the board as the board is moved into position, as shown in FIG. 2. Template 24, which as shown in FIG. 6, is a generally rectangular plate having openings 25 and 26 to receive pins 19 and 20, which in turn positions the template on the outside surface of covering member 16. As explained above, when the covering member is of a thin material, such as wood paneling, that is more dense than the gypsum type of wall covering, the long portions 19a and 20a are inserted in mounting holes 14 and 15, respectively, to mount the locator pin assembly on the outlet box with short portions 19b and 20b positioned to pierce the thinner covering member.

The template is designed to provide an access opening of the desired size and shape for the particular outlet box. The template can be held in place by hand and the access opening cut, using the outside surface of the template as a guide. Alternatively, the shape of the access opening could be marked on the cover member, using the template as a guide, and then after the template is removed, the access opening could be cut.

Generally, it is preferable to hold the template firmly in position, therefore this is one of the purposes and features of the extractor means provided in accordance with this invention. As shown in FIG. 1, template 24 is provided with opening 27 which is in axial alignment with opening 28 in plate 21 of the locator pin assembly. The diameter of opening 27 is such that the extractor can pass through this opening without engaging the template. In the embodiment shown, the extractor includes threaded member 30 which is provided with a relative sharp point and self tapping threads so that it can be forced with relative ease through covering member 16 and into engagement with opening 28 of the locator pin assembly. The self tapping threads engage the walls of opening 28 and securely attach the threaded member to the locator plate 21. Washer 32 is attached to threaded member 30 so that as the threaded member is made up in opening 28 it will pull washer 32 into snug engagement with the template. With the extractor in place, the access opening can be cut and the template, the scrap left from the cutting of the access opening, and locator pin assembly 18 can then be removed together through the access opening.

The embodiment shown in FIG. 7 is an alternate embodiment of the invention for use with electrical outlet boxes of the type shown. Such boxes are usually used for ceiling fixtures. In this embodiment, locator pins 40 and 42 extend perpendicularly from opposite sides of body or plate 44. The pins extend outwardly different distances for the reasons explained above. The pins are in axial alignment and may comprise one integral member that extends through an opening in plate 44. The locator pin assembly is mounted on outlet box 46 by mounting screws 48. After the covering member is in place, template 50 is positioned with the pin in opening 52 of the template and the access opening is cut.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. Apparatus for locating an access opening to an electrical outlet box concealed behind a covering member comprising a locator pin assembly for mounting on the outlet box, said assembly having a plate member and sharp-pointed locator pins extending perpendicularly from both sides of the plate member with the pin on one side extending a relatively short distance from the plate member for piercing a relatively thin covering member, such as a wood panel, and the pin on the other side extending a relatively longer distance from the plate member for piercing a relatively thick covering member, such as wallboard, means for mounting the locator pin assembly on the outlet box with the proper length of pin positioned to pierce the wall covering, and a template for positioning on the pin after it has pierced the wall covering to indicate the proper position for the access opening.

2. The apparatus of claim 1 in which the locator pin assembly includes two locator pins on each side of the plate and in which the means for mounting the locator pin assembly include the pins on the side of the plate member facing the outlet box positioned to extend into the mounting holes of the outlet box to mount the assembly in the box.

3. Apparatus for locating an access opening through a covering member to an electric outlet box that is open on one side to receive electrical apparatus and is mounted between studding in the construction of walls for buildings and which has mounting holes for mounting electrical apparatus in the outlet box, comprising a locator pin assembly including two locator pins, each sharpened at both ends, and means for holding the pins in fixed parallel relationship for insertion into the mounting holes of an outlet box and for limiting the distance the pins can be inserted into said holes, said holding means engaging the pins so that in one position the pins extend outwardly from the mounting holes a relatively short distance to pierce relatively thin covering members and in the reversed position the pins extend outwardly from the mounting holes a relatively longer distance to pierce relatively thick covering members, and a template for engaging the pins as they extend through the covering members to guide a cutting tool for cutting an access opening in the covering member to receive the outlet box and through which the locator pin assembly can be removed with the covering member in position.

4. The apparatus of claim 3 further provided with extractor means for connecting the template to the locator pin assembly with the scrap from the access opening therebetween to allow the template, the scrap, and the locator pin assembly to be removed together from the opening.

5. The apparatus of claim 4 in which the template and the locator pin assembly are provided with aligned openings and the extractor means includes means for extending through the openings to connect the template to the locator pin assembly.

6. The apparatus of claim 4 in which the extractor means includes a threaded member for extending through the opening in the template to threadedly engage the opening in the locator pin plate.

7. The apparatus of claim 6 in which the threaded member has a self tapping thread for penetrating the scrap and for engaging the locator pin plate.

* * * * *